(12) United States Patent
Wang

(10) Patent No.: US 8,820,776 B2
(45) Date of Patent: Sep. 2, 2014

(54) FOLDING GOLF CART

(71) Applicant: Jonathan Wang, Hayward, CA (US)

(72) Inventor: Jonathan Wang, Hayward, CA (US)

( * ) Notice: Subject to any disclaimer, the term of this patent is extended or adjusted under 35 U.S.C. 154(b) by 0 days.

(21) Appl. No.: 13/926,396

(22) Filed: Jun. 25, 2013

(65) Prior Publication Data

US 2014/0001734 A1 Jan. 2, 2014

(30) Foreign Application Priority Data

Jun. 27, 2012 (CN) .......................... 2012 2 0304848

(51) Int. Cl.
*B62B 3/02* (2006.01)
*A63B 55/08* (2006.01)
*B62B 1/00* (2006.01)

(52) U.S. Cl.
CPC ........... *A63B 55/08* (2013.01); *B62B 2202/404* (2013.01); *B62B 2205/00* (2013.01); *B62B 1/00* (2013.01)
USPC .......................................... 280/651; 280/641

(58) Field of Classification Search
USPC ............................. 280/651, DIG. 6
See application file for complete search history.

(56) References Cited

U.S. PATENT DOCUMENTS

| | | | | |
|---|---|---|---|---|
| 5,582,419 | A * | 12/1996 | Lucia et al. | 280/42 |
| 6,152,465 | A * | 11/2000 | Shieh | 280/62 |
| 6,715,785 | B2 * | 4/2004 | Shieh | 280/651 |
| 6,749,214 | B2 * | 6/2004 | Shieh | 280/651 |
| 7,128,333 | B2 * | 10/2006 | Reimers et al. | 280/651 |
| 7,137,644 | B2 * | 11/2006 | Kimberley | 280/651 |
| 7,147,242 | B2 * | 12/2006 | Wu | 280/641 |
| 7,213,830 | B2 * | 5/2007 | Liao | 280/651 |
| 7,770,912 | B2 * | 8/2010 | Liao | 280/651 |
| 7,862,053 | B2 * | 1/2011 | Liao | 280/47.34 |
| 7,866,685 | B2 * | 1/2011 | Liao | 280/651 |
| 8,104,777 | B2 * | 1/2012 | Liao | 280/38 |
| 8,191,920 | B2 * | 6/2012 | Zhang | 280/651 |
| 8,226,112 | B2 * | 7/2012 | Liao | 280/651 |
| 8,282,121 | B2 * | 10/2012 | Lin | 280/651 |
| 8,292,321 | B2 * | 10/2012 | Liao | 280/652 |
| 8,366,140 | B2 * | 2/2013 | Wu | 280/651 |
| 8,393,633 | B2 * | 3/2013 | Liao | 280/651 |
| 8,403,355 | B2 * | 3/2013 | Liao | 280/651 |
| 8,439,390 | B2 * | 5/2013 | Zhang | 280/641 |
| 8,500,153 | B2 * | 8/2013 | Liao | 280/651 |
| 8,596,653 | B2 * | 12/2013 | Liao | 280/47.26 |
| 8,613,463 | B2 * | 12/2013 | Liao | 280/651 |
| 8,720,912 | B2 * | 5/2014 | Liao | 280/47.26 |
| 2011/0285111 | A1 * | 11/2011 | Liao | 280/651 |
| 2012/0112436 | A1 * | 5/2012 | Liao | 280/651 |
| 2012/0261908 | A1 * | 10/2012 | Liao | 280/651 |
| 2012/0306182 | A1 * | 12/2012 | Liao | 280/651 |

(Continued)

*Primary Examiner* — Jeffrey J Restifo
(74) *Attorney, Agent, or Firm* — Maier & Maier, PLLC

(57) ABSTRACT

A folding golf cart, including a bottom frame, the pillar, the handle, the front wheel and the rear wheel, the rear-wheel carrier, the folding connecting rod, the support rod, the connecting rod and the sliding seat. The bottom end of the pillar is connected to the back-end part of the bottom frame. The bottom of the handle is designed with a connector whose one end is connected to the near-top part of the pillar and the other to one end of the folding connecting rod. The other end of the folding connecting rod is hinged to the back end of the bottom frame, the front ends of both the rear-wheel carriers are connected on both sides of the sliding seat and the two sides of the support rod are hinged to the pillar and the rear-wheel carrier.

13 Claims, 5 Drawing Sheets

(56) References Cited

U.S. PATENT DOCUMENTS

| | | | |
|---|---|---|---|
| 2013/0026738 A1* | 1/2013 | Liao | 280/651 |
| 2013/0026739 A1* | 1/2013 | Liao | 280/651 |
| 2013/0087994 A1* | 4/2013 | Pratt | 280/651 |
| 2013/0093165 A1* | 4/2013 | Liao | 280/651 |
| 2013/0229001 A1* | 9/2013 | Liao | 280/651 |
| 2013/0300090 A1* | 11/2013 | Wang | 280/651 |
| 2014/0001734 A1* | 1/2014 | Wang | 280/641 |
| 2014/0159348 A1* | 6/2014 | Wu | 280/651 |

\* cited by examiner ps://Enterprise

FOLDING GOLF CART

RELATED APPLICATIONS

This application claims priority under 35 U.S.C. §119 to Chinese Patent Application No. 201220304848.X filed Jun. 27, 2012, the disclosure of which is incorporated by reference herein in its entirety.

TECHNICAL FIELD

This utility model concerns the golf cart field, especially one type of folding golf cart.

BACKGROUND TECHNOLOGY

As principal requirements, the frame structure of a golf cart must be large enough to carry different sizes of golf bags. Generally, the upper and lower brackets on a golf cart support the upper and lower parts of a golf bag. This means that a large spacing should exist between the upper and lower brackets of golf bags, which cause difficulties with storage or transportation of golf carts. The existing folding golf cart mainly comprises a bottom frame, pillar and handle etc and these parts are generally soldered together, which makes the golf cart impossible to be folded. Thus, the volume of the cart cannot be reduced during the transportation and storage and thus requires greater containers, bigger space or packing boxes to keep or collect such carts and finally increases the cost for transportation and storage. On the other hand, to the users, the cart requires bigger space for storage since it cannot be folded and thus makes it inconvenient to perform such operations.

CONTENTS OF UTILITY MODEL

The purpose of this utility model is to provide one model of easy-to-use space-saving folding golf cart aiming at deficiencies in existing technologies.

The technical solutions adopted in the utility model to achieve the above purposes are described as below:

The folding golf cart is composed of a bottom frame, pillar, handle, the front wheel and rear wheel mounted to the front part of the bottom frame, two rear wheel carriers used to install the rear wheels, the folding connecting rod, the support rod, the connecting rod and the sliding seat set on the pillar. The bottom end of the pillar is connected to the back-end part of the bottom frame. The bottom of the handle is designed with a connector whose one end is connected to the near-top part of the pillar and the other to one end of the folding connecting rod. While, the other end of the said folding connecting rod is hinged to the back end of the bottom frame; the front ends of both the rear-wheel carriers are connected on both sides of the sliding seat and the two sides of the support rod are hinged to the pillar and the rear-wheel carrier. The two sides of the connecting rod are connected to the sliding seat and the bottom frame respectively.

The said pillar, connector, folding connecting rod and the bottom frame together compose a parallel four-connecting-rod structure where one action of the rod can drive and control the free folding and unfolding of the whole golf cart.

The top of the said pillar is designed with a lock device used to lock and fix the connector. The lock device consists of the fixed seat on the top of the pillar, the button designed on the fixed seat, the pushing slip sheet secured inside the fixed seat, the brake pillar fastened to the connector, two rotatable locking pieces secured from the vertical direction into the fixed seat, the two locking pieces are designed with opening-closing slope towards the brake pillar; the brake pillar is designed with a locking trough near to the head. The head of the brake pillar goes through the two locking pieces which are then geared into the trench respectively. The raised toggle post is designed at the top of the locking pieces and the top of the pushing slip sheet is connected to the button while the bottom of the pushing slip sheet is designed with the thrust surface at the both sides. The two thrust surfaces are pressed against the toggle post of the two locking pieces.

The said button has one end hinged to the fixed seat and the top of the pushing slip sheet is connecting the two ends of the button. There is a press return spring between the button and the fixed seat. An offsetting spring helping move the locking piece is designed to connect the locking pieces and the fixed seat.

The mentioned brake pillar has the spherical surface in the head.

The said pillar has a locating fastener fixed at the bottom. The locating fastener goes raised and is designed with a trapezoid locating area; the sliding seat is designed with a trapezoid locating slot corresponding to that locating area. The trapezoid locating area is geared into the trapezoid locating slot when the golf cart is open.

The mentioned bottom frame is designed with a locating trough corresponding to the support rod and the support rod is geared into the locating trough when the golf cart is open.

The mentioned front wheel is mounted to the front part of the bottom frame through the front-wheel connecting device which contains the fixed fitting seat installed onto the front end of the bottom frame, the fitting shaft mounted onto the fixed fitting seat and the front-wheel seat set onto the fitting shaft by slipping ways. The front wheel is connected to the front-wheel seat and a front-wheel spring is designed to connect the fitting shaft and the front-wheel seat. The front end of the fixed fitting seat is square in structure and the back end of the front-wheel seat is designed with locating slot holes corresponding to the fixed fitting seat and the locating slot holes of the fixed front-wheel seat is set onto the front part of the fixed fitting seat.

The mentioned fixed fitting seat has certain taper at the front.

The said bottom frame is a single-tube or double-tube structure.

The advantages of this utility model: this model is composed of the bottom frame, the pillar, the handle, the front wheel and rear wheel, the rear-wheel carrier, the folding connecting rod, the support rod, the connecting rod and the sliding seat. The bottom end of the pillar is connected to the back-end part of the bottom frame. The bottom of the handle is designed with a connector whose one end is connected to the near-top part of the pillar and the other to one end of the folding connecting rod. While, the other end of the said folding connecting rod is hinged to the back end of the bottom frame; the front ends of both the rear-wheel carriers are connected on both sides of the sliding seat and the two sides of the support rod are hinged to the pillar and the rear-wheel carrier. The two sides of the connecting rod are connected to the sliding seat and the bottom frame respectively. This utility model realizes the interlock among the bottom frame, the pillar, the handle and the rear-wheel carrier through the folding connecting rod, the support rod, the connecting rod and sliding seat. While operating the cart, please bend the handle backwards and then bend the pillar and the folding connecting rod towards the bottom frame and finally fold the cart into a Z-shaped three-fold folding state. The cart can realize free and flexible extending and folding with only one action, providing easy folding and unfolding and convenient operation. When operating it, its volume can be cut down greatly and great space can be saved. It is easy to store or carry along with its simple structure.

FIGURE DESCRIPTION

DETAILED IMPLEMENTATION METHOD

Figure 1:
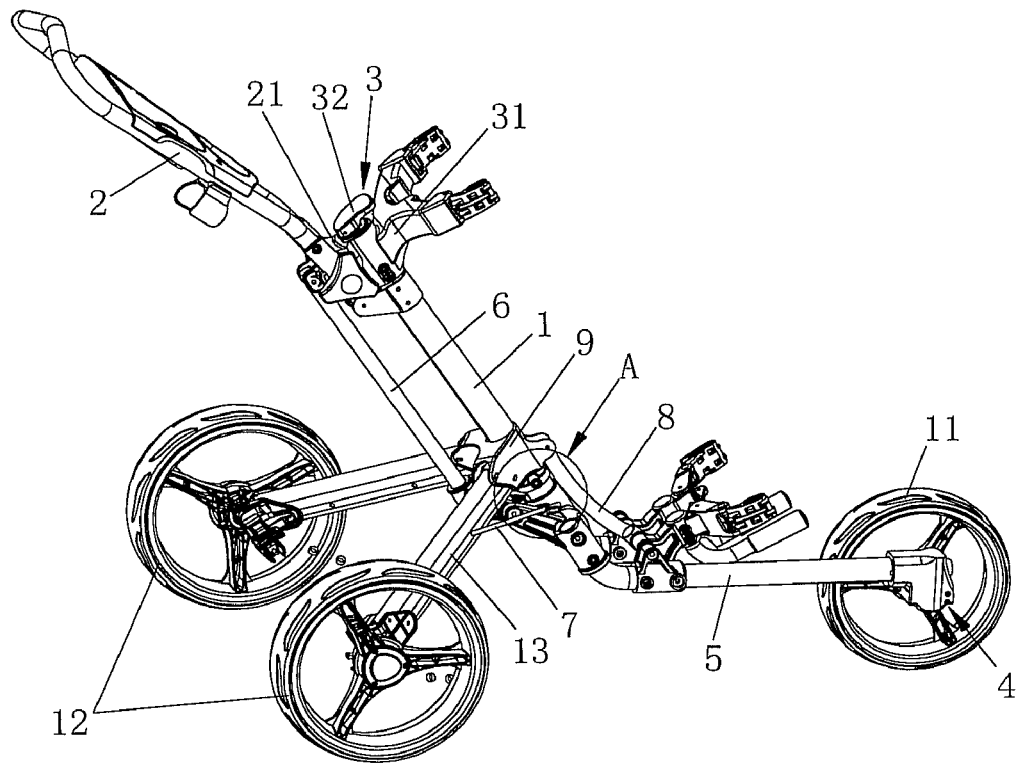
FIG. 1 is a structural representation of the utility model.
Figure 2:
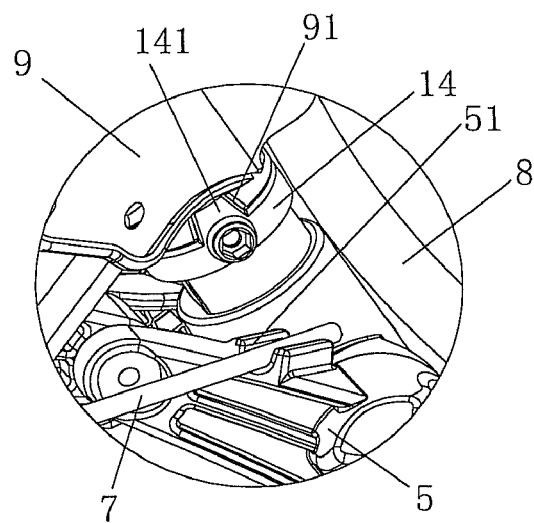
FIG. 2 is an enlarged view of the part "A" of the utility model
Figure 3:
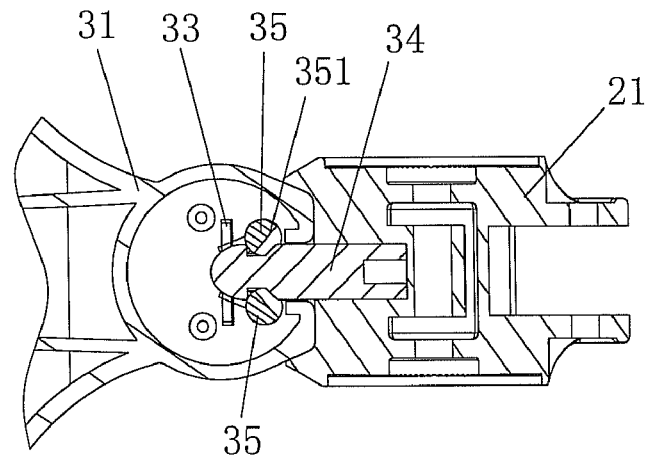
FIG. 3 is a cross-sectional view of lock device of the utility model
Figure 4:
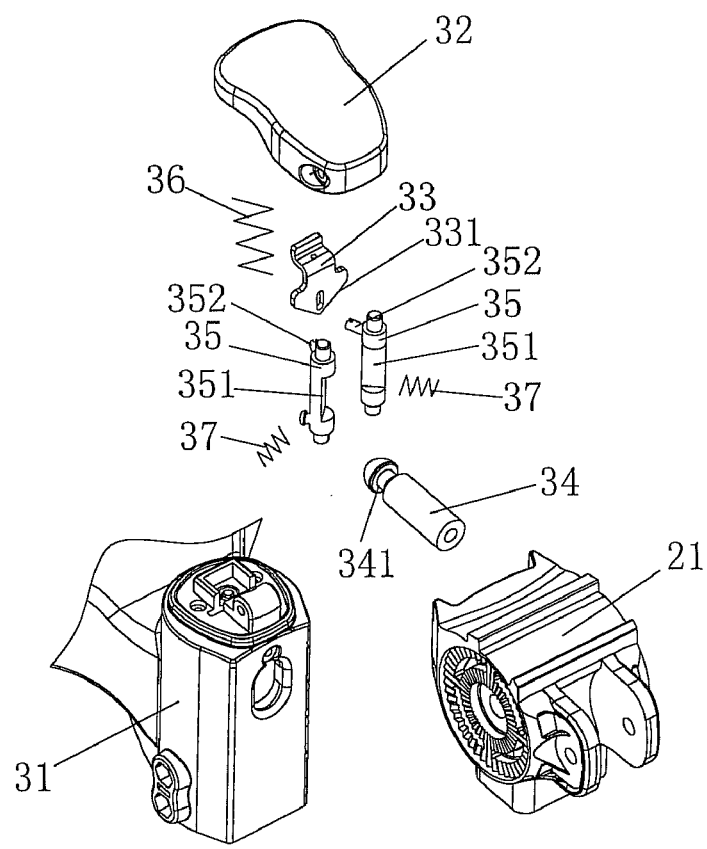
FIG. 4 is a breakdown view of the lock device of the utility model.
Figure 5:
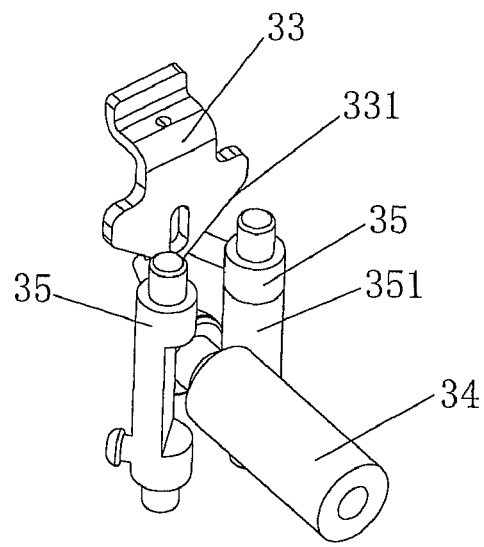
FIG. 5 is a structural representation of the lock structure of the utility model
Figure 6:
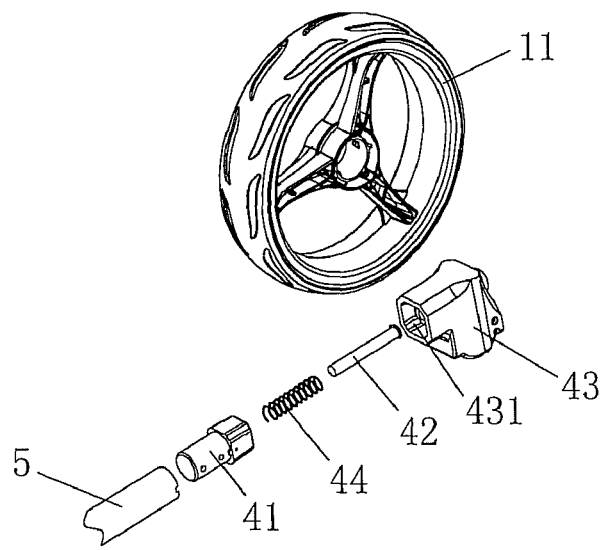
FIG. 6 is a structural representation of front-wheel release device of the utility model.
Figure 7:
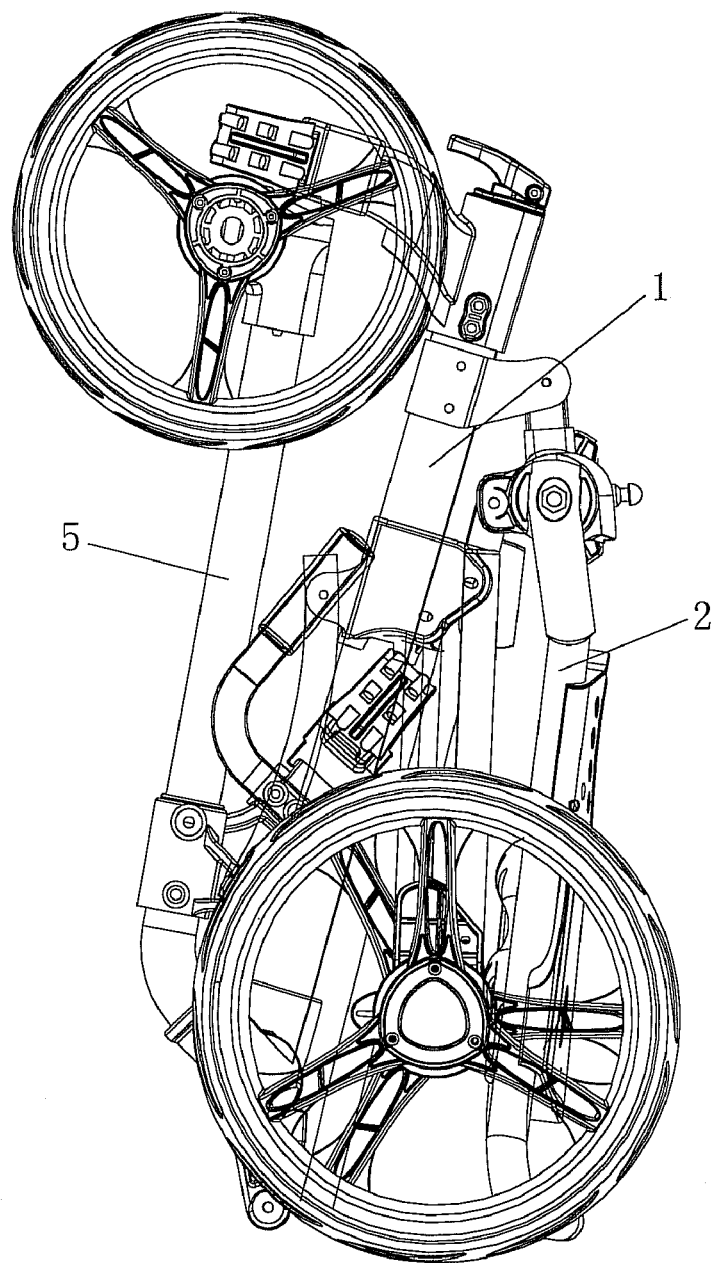
FIG. 7 is a structural representation of the folding state of the utility model.
Figure 8:
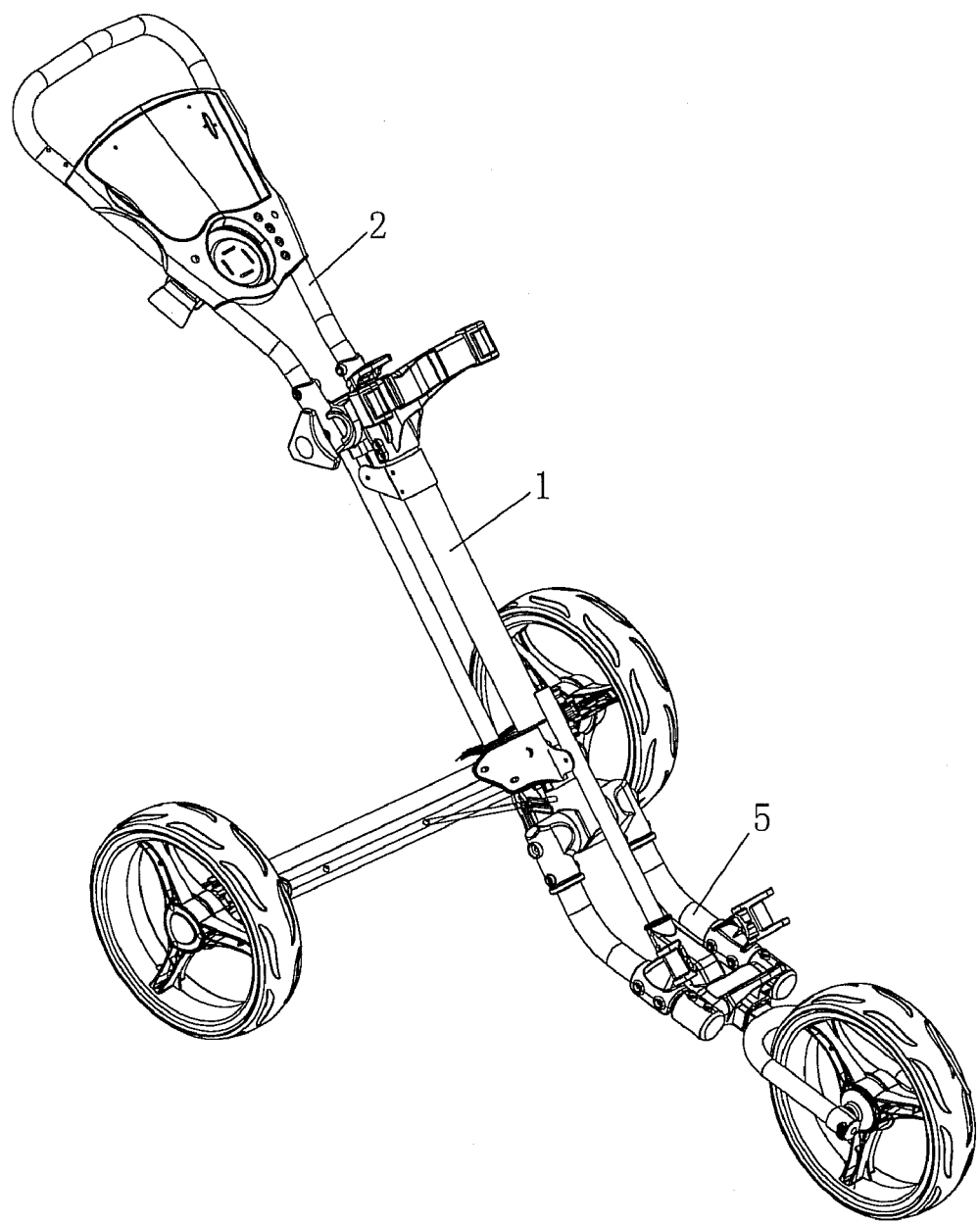
FIG. 8 is a sketch showing another structure of the utility model.

The following paragraphs will further describe this utility model in combination with the attached figure. As shown in FIGS. 1-8, the folding golf cart contains the bottom frame (5), the pillar (1), the handle (2), the front wheel (11) and rear wheel (12) mounted to the bottom frame (5), the rear-wheel carrier (13) used to install the rear wheel (12), the folding connecting rod (6), the support rod (7), the connecting rod (8) and the sliding seat (9) set on the pillar (1) by sliding means. The bottom end of the pillar (1) is connected to the back-end part of the bottom frame (5). The bottom of the handle (2) is designed with a connector (21) whose one end is connected to the near-top part of the pillar (1) and the other to one end of the folding connecting rod (6). While, the other end of the said folding connecting rod (6) is hinged to the back end of the bottom frame (5); the front ends of both the rear-wheel carriers (13) are connected on both sides of the sliding seat (9) and the two sides of the support rod (7) are hinged to the pillar (1) and the rear-wheel carrier (13). The two sides of the connecting rod (8) are connected to the sliding seat (9) and the bottom frame (5) respectively.

The pillar (1), the connecting piece (21), the folding connecting rod (6) and the bottom frame (5) together forms a parallel four-rod mechanism where one rod piece action can control the free extending and folding of the whole cart. They bring stable structure and reliable transmission. The action of the connecting piece (21) in the four-rod mechanism can drive and control the corresponding actions of the rest components. The bottom frame (5), the pillar (1), the rear-wheel carrier (13), the support rod (7), the connecting rod (8) and the sliding seat (9) form another link mechanism too.

The top of the pillar (1) is designed with a lock device (3) used to lock and fix the connector (21). The lock device consists of the fixed seat (31) on the top of the pillar (1), the button (32) designed on the fixed seat (31), the pushing slip sheet (33) secured inside the fixed seat (31), the brake pillar (34) fastened to the connector (21), two rotatable locking pieces (35) secured from the vertical direction into the fixed seat (31), the two locking pieces (35) are designed with opening-closing slope (351) towards the brake pillar (34); the brake pillar (34) is designed with a locking trough (341) near to the head. The head of the brake pillar (34) goes through the two locking pieces (35) which are then geared into the trench (341) respectively. The raised toggle post (352) is designed at the top of the locking pieces (35) and the top of the pushing slip sheet (33) is connected to the button (32) while the bottom of the pushing slip sheet (33) is designed with the thrust surface (331) at the both sides. The two thrust surfaces (331) are pressed against the toggle post (352) of the two locking pieces (35). The locking device (3) of this utility model chucks the brake pillar (34) from the two sides by using the two locking pieces (35), making the lock more reliable. Press only the button (32) and then the pushing slip sheet (33) will push the two locking pieces (35) rotate and open and thus release the brake pillar (34) and finally unlock. This structure makes it easy to unlock and convenient to operate the cart.

The diameter of the brake pillar (34) head is bigger than the shortest distance between the two locking pieces (35), enabling the two locking pieces (35) to lock the head of the brake pillar (34). The shortest distance between the locking pieces (35) at the time when the two locking pieces (35) rotates to be parallel with the opening-closing slope (351) is bigger than the diameter of the brake pillar (34) head. The locking piece (35) is a cylinder structure and its peripheral surface is designed with troughs and then forms an opening-closing slope (351). Under normal conditions, the opening-closing slopes of the two locking pieces are angular. When the brake pillar (34) are inserted into the two locking pieces (35), the head of the brake pillar (34) will push the opening-closing slope (351) of the two locking pieces (35) and make the two rotate to be parallel with the two opening-closing slope (351) and then go through. Later, the two locking pieces (35) will rotate and return. At this time, the head of the brake pillar (34) is locked by the two locking pieces (35) and cannot get released and thus the locking device is locked. It means that the golf cart is fixed at the extending state and cannot be folded. Then press down button (32) and the button (32) will push the pushing sliding sheet to slide downwards and the two thrust surfaces (331) at the bottom of the pushing slip sheet will work on the toggle post (352) of the locking pieces (35) and make the two locking pieces rotate to be parallel with the opening-closing slope (351). This time, the head of the brake pillar (34) can go released from the lock of the two locking pieces (35) and thus the locking device (3) is unlocked and the handle (2) can be operated freely and fold the cart.

One end of the button (32) is hinged to the fixed seat (31) and the top of the pushing slip sheet (33) is connected between the two ends of the button (32), making the moment arm of the button (32) longer and thus requires less strength to press the button to unlock. Between the button (32) and the fixed seat (31), there is a return spring (36) which makes the button (32) capable to return upwards after being pressed. There is a rotatable return spring (37) between the locking piece (35) and the fixed seat (31) and it is used to help the locking pieces rotate and return and allow the locking piece (35) to rotate and reset automatically.

The head of the brake pillar (34) is spherical in structure, which makes the inserting of the brake pillar (34) into the two locking pieces (35) smooth and easy.

The pillar has a locating fastener (14) fixed near to the bottom and the locating fastener has a raised trapezoid locating area 141. The bottom of the sliding seat (9) is designed with a trapezoid locating slot (91) corresponding to the locating area (141). When the golf cart is open, the trapezoid area (141) is chucked into the locating slot (91). The trapezoid locating area (141) and the trapezoid locating slot (91) will work together to fix and lock the sliding seat (9) more reliably, preventing the sliding seat (9) from swaying.

The bottom frame (5) is designed with locating trough (51) corresponding to the support rod (7). When the golf cart is open, the support rod is chucked into the locating trough (51), bringing a better locating effect. It makes the golf cart open more stable without any swaying.

The front wheel (11) is mounted to the front part of the bottom frame (5) through the front-wheel connecting device (4) which contains the fixed fitting seat (41) installed onto the front end of the bottom frame (5), the fitting shaft (42) mounted onto the fixed fitting seat (41) and the front-wheel seat (43) set onto the fitting shaft by slipping ways. The front wheel (11) is connected to the front-wheel seat (43) and a front-wheel spring (44) is designed to connect the fitting shaft (42) and the front-wheel seat (43). The front end of the fixed fitting seat (41) is square in structure and the back end of the front-wheel seat (43) is designed with locating slot holes (431) corresponding to the fixed fitting seat (41) and the locating slot holes of the fixed front-wheel seat (43) is set onto the front part of the fixed fitting seat (41). Pull out the front-wheel seat (43) forwards to make it rotate freely. The swaying direction of the front wheel (11) can be adjusted according to actual needs. When folding the golf cart, you can pull out the front wheel (43) forwards and rotate it for 90 degree to make the front wheel stand horizontally and thus reduce the volume of the folded golf cart better.

The front end of the fixed fitting seat (41) has certain taper, which make the locating slot holes of the front-wheel seat can be set on the front end of the fixed fitting seat easier and connected more reliable. Of course, the fitting shaft (42) can be pulled out of the fixed fitting seat (41) and thus the front wheel (11) can be detached and thus the volume can be further reduced to make the transportation easier.

The front wheel (11) is connected to the front-wheel seat (43) through the adjusting gear. You can adjust the axle of the front wheel (11) by two screws in order to line up the front wheel (11).

The bottom frame (5) is a single-tube or double-tube structure.

The bottom frame (5), pillar (1), handle (2) and rear-wheel carrier (13) of this utility model realizes interlock through the folding connecting rod (6) and the support rod (7), the connecting rod (8) and the sliding seat (9). While using the cart, you should turn the handle (2) backwards to instruct the pillar (1) and the folding connecting rod (6) towards the bottom frame and thus fold the cart into a Z-shaped three-fold state. The cart can realize free and flexible extending and folding with only one action, providing easy folding and unfolding and convenient operation. When operating it, its volume can be cut down greatly and great space can be saved. It is easy to store or carry along with its simple structure.

Of course, the above mentioned explanations tell only the relatively good implementation cases of this utility model. Thus all the equal changes or ornaments made according to the structure, characteristics and principle described in this utility model patent application shall be included in the range of patent application of this utility model.

What is claimed is:

1. A folding golf cart comprising:
   a bottom frame with a front end and a back end;
   a pillar with a top end and a bottom end, the bottom end hingedly coupled to the back end of the bottom frame;
   a folding connecting rod with a first end and a second end, the first end hingedly coupled to the back end of the bottom frame a handle with a connector on a bottom portion, the connector having a first end coupled to the top end of the pillar, and a second end coupled to the second end of the folding connecting rod;
   a sliding seat coupled to the pillar and operable to slide along a length of the pillar between the top end and the bottom end;
   a first rear wheel carrier with a front end connected on a first side of the sliding seat and a back end coupled to a first rear wheel;
   a second rear wheel carrier with a front end connected on a second side of the sliding seat and a back end coupled to a second rear wheel;
   a first support rod with a first end hingedly coupled to the bottom end of the pillar and a second end hingedly coupled to the first rear wheel carrier;
   a second support rod with a first end hingedly coupled to the bottom end of the pillar and a second end hingedly coupled to the second rear wheel carrier;
   a connecting rod with a first end coupled to a front of the sliding seat and a second end coupled to the bottom frame;
   a front wheel coupled to the front end of the bottom frame;
   a lock device on the top end of the pillar operable to transition the connector between a locked position and a released position, the lock device comprising:
   a fixed seat on the top of the pillar;
   a pushing slip sheet received within the fixed seat, the pushing slip sheet having a top and a bottom and an angled thrust surface between the top and the bottom;
   a brake pillar coupled to the connector, the brake pillar having a head and a locking trough proximate the head;
   first and second rotatable locking pieces received within the fixed seat in a vertical direction, the first and second rotatable locking pieces each having a sloping surface toward the brake pillar and a raised toggle post on a top end, wherein the thrust surface of the pushing slip sheet rests against the raised toggle posts of the first and second rotatable locking pieces, and
   a button coupled to the top of the pushing slip sheet.

2. The folding golf cart of claim 1, wherein the pillar, connector, folding connecting rod and bottom frame compose a parallel four-connecting-rod structure where an action of the connector can drive and control the free folding and extending of the whole golf cart.

3. The folding golf cart of claim 1, wherein the brake pillar is received between the first and second rotatable locking pieces by pressing the head into the sloping surfaces of the first and second rotatable locking pieces to rotate the sloping surfaces of the first and second rotatable locking pieces until the first and second rotatable pieces are received within the locking trough to fix the connector in the locked position.

4. The folding golf cart of claim 3, wherein the connector is movable from the locked position to the released position by depressing the button which pushes the pushing slip sheet down such that the angled thrust surface acts on the raised toggle posts to rotate the first and second rotatable locking pieces such that the sloping surfaces are substantially parallel to each other, allowing the head of the brake pillar to release from the first and second rotatable locking pieces.

5. The folding golf cart of claim 1, wherein when the connector is in the locked position, the golf cart is in a fixed state, and when the connector is in the released position the golf cart is collapsible.

6. The folding golf cart of claim 1, further comprising: a press return spring between the button. and the fixed seat; and a first offsetting spring between the first rotatable locking piece and fixed seat biased against a rotational movement biased against; and a second offsetting spring between the second rotatable locking piece and fixed seat biased against a rotational movement of the second rotatable locking piece.

7. The folding golf cart of claim 1, wherein the head of the brake pillar is spherical.

8. The folding golf cart of claim 1, further comprising: a locating fastener coupled to the bottom end of the pillar, the locating fastener having a raised trapezoid locating area; a trapezoid locating slot on a bottom of the sliding seat, wherein the raised trapezoid locating area is received in the trapezoid locating area.

9. The folding golf cart of claim 1, further comprising: a first locating trough on the bottom frame that receives the first support rod; and a second locating trough on the bottom frame that receives the second support rod.

10. The folding golf cart of claim 1, further comprising: a front wheel connecting device to couple the front wheel to the front end of the bottom frame, the front wheel connecting device comprising: a fixed fitting seat with a first end coupled to the front end of the bottom frame, and a second end with a square head; a front wheel seat with a square recess to receive the fixed fitting seat on one end and further coupled to the front wheel; a fitting shaft coupled between the fixed fitting seat and the front wheel seat.

11. The folding golf cart of claim 10, wherein the square head of the fixed fitting seat is removed from the square recess of the front wheel seat, which permits the front wheel to rotate from a vertical position to a horizontal position.

12. The folding golf car of claim 10, wherein the fixed fitting seat is tapered on the second end.

13. The folding golf car of claim 1, wherein the bottom frame is a single tube or a double tube structure.

\* \* \* \* \*